Feb. 6, 1940. S. F. DAVENPORT 2,189,487
FISH LURE
Filed Jan. 25, 1939

Inventor
S. F. Davenport
By Eccleston & Eccleston,
Attorneys

Patented Feb. 6, 1940

2,189,487

UNITED STATES PATENT OFFICE 2,189,487

FISH LURE

Sam F. Davenport, Garrett, Ind., assignor to Creek Chub Bait Company, Garrett, Ind.

Application January 25, 1939, Serial No. 252,833

4 Claims. (Cl. 43—46)

This invention relates to artificial lures and has for its primary object to generally improve structures of this type.

Another object of the invention consists in providing a lure having a relatively long hair tail which will function to simulate to a high degree the movements of a swimming minnow.

A further object of the invention resides in the provision of a lure having a fore-shortened body and a wide fan-shaped tail which is extremely flexible and will therefore closely follow the movements of the tail of a swimming minnow.

Another object of the invention consists in so mounting the rear hook of the lure that while it is freely movable its movement is limited to the extent that it cannot become entangled with the fan-shaped tail of the lure.

Another object of the invention resides in the combination of a lure with a reflector plate or mirror which is attached to the top of the head of the lure and serves to attract the fish by reflecting the light as the lure is caused to wabble in the water.

Other objects and advantages of the invention will be apparent from the following description when taken in connection with the accompanying drawing in which.

Figure 1:
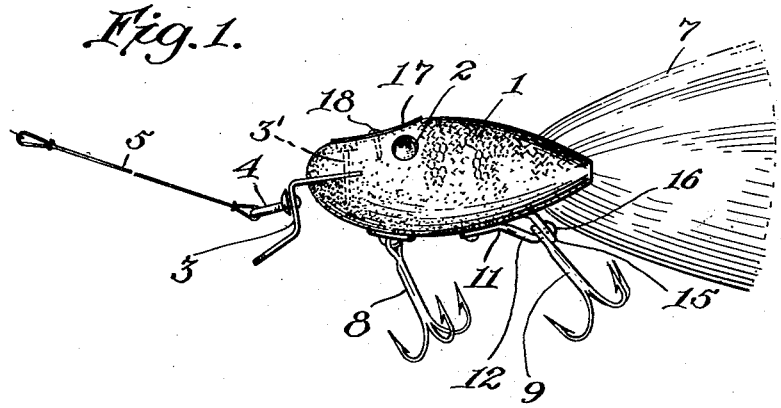
Figure 1 is a side elevational view of the completed lure.
Figure 2:
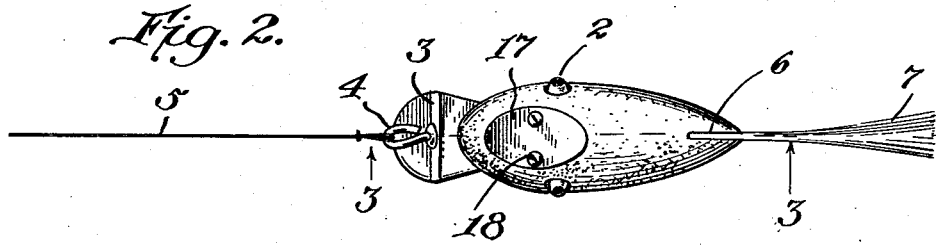
Figure 2 is a top plan view thereof.

Referring to the drawing in more detail the numeral 1 indicates a fore-shortened body in representation of a small fish such as a minnow and formed of wood or other buoyant material. The lure body is provided with eyes 2 and a more or less vertically extending plate 3 mounted at the forward end of the lure and assisting in creating or amplifying a wobbling movement in the lure as it is drawn through the water. The plate is secured by a screw 3' and a swiveled eye-bolt 4 is connected to the plate 3 and serves as an anchor for the usual fish line 5.

The rear end of the fore-shortened body of the lure is provided with a vertical slot 6 in which is positioned the base end of a fan-shaped tail 7. The tail 7 is preferably formed of hair and is produced in the manner described in my Patent #2,018,622 granted October 22, 1935. In that patent a method of forming double wings for a lure of the insect type is described, and in producing the fan-shaped tail it is only necessary to cut one of the double wings in two so as to provide two simulated tails, one of which is shown in the present drawing. The base of the tail is preferably glued in the slot 6 with any desired waterproof adhesive.

The tail 7 is of a length substantially equal to the length of the fore-shortened body 1, and is considerably wider, in a vertical direction, than the width of the lure in the same direction. The size and proportions of the tail together with the fact that it is formed of hair renders it highly flexible so that the wiggling movement of the lure body imparts a natural waving action to the tail in very close approximation of the movements of the tail of a small fish.

Figure 3:
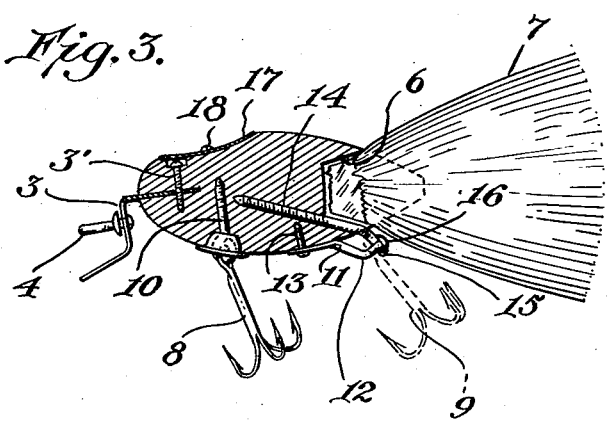
Figure 3 is a vertical sectional view taken on line 3—3 of Figure 2.
Figure 4:
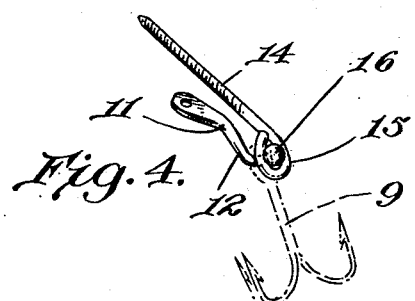
Figure 4 is a perspective view of the attaching and limiting means for mounting the rear hook on the lure body.

Mounted on the under-side of the lure body 1 is a pair of gang hooks 8 and 9. The forward hook 8 is secured in the usual manner by means of an eye bolt 10 screwed into the body of the lure adjacent the forward end thereof or by any other suitable means. The rear hook 9 is desirably mounted in such a way that it may have freedom of movement and yet will be limited to the extent that it cannot become entangled with the flexible fan-shaped tail 7. To this end the hook 9 is mounted on a bracket 11 in the form of a rod having an offset portion 12. The bracket is anchored at one end to the lure body by means of a screw 13 and its opposite end is secured to the lure body by means of a screw 14. The screw 14 is provided with an eye 15 which receives the rear end of rod 11 and the latter is provided with a head 16 adapted to interlock with the eye 15. As will be seen from an inspection of Figures 1 and 3 the hook 9 is free to move upon its bearing constituted by the offset portion 12 of the rod 11, but upward swinging of the hook to a point where it might become entangled with the wide and flexible tail 7 is prevented by the rearwardly inclined eye 15 which limits the rearward movement of the hook. It thus becomes apparent that while the hook is allowed free movement for all necessary purposes it is safeguarded against engagement with the tail.

An added attraction for the fish consists of a reflector plate 17 which is mounted on top of the head of the lure body. The plate is substantially oval in outline and is preferably secured in position by a pair of small screws 18. In operation, the wobbling action of the lure body is of course transmitted to the plate which serves to reflect the light and thereby attract the attention of the fish. Moreover, the plate enhances the appearance of the completed lure by concealing the relatively large screw 3' which is employed to secure the plate 3 in position.

From the foregoing description and the accompanying drawing it will be apparent to those skilled in the art that I have devised a simple yet life-like representation of a small fish; that the fore-shortened body and the relatively long and wide tail formed of hair is highly flexible and therefore readily lends itself to the simulation of the movements of the tail of a small fish when the lure is caused to wabble as it is drawn through the water; that the mounting of the rear hook is such as to provide freedom of movement and yet prevent entanglement with the fan-like tail; and that the reflector plate is so designed and positioned as to reflect the light and thereby attract the attention of the fish as well as to conceal certain of the structural details of the lure.

In accordance with the patent statutes I have described what I now believe to be the preferred form of construction of the lure, but it will be readily apparent that various minor changes may be made in structural details without departing from the spirit of the invention, and it is intended that such changes be included within the scope of the accompanying claims.

What I claim is:

1. A fish lure including a body portion, a flexible tail secured to the body portion, a fish hook, and means for connecting the hook to the body, said means including a rod and fasteners for securing the ends of the rod to the body, one of said fasteners extending downwardly and rearwardly through a major portion of the body and being adapted to limit movement of the hook toward the tail.

2. A fish lure including a body portion, a fish hook, and means for connecting the hook to the body, said means including a rod on which the hook is mounted and screws for securing the rod to the body, one of said screws being inclined downwardly and rearwardly, an eye on said screw connected with the rear end of the rod and adapted to limit rearward movement of the hook.

3. A fish lure including a body portion, a flexible tail secured to the body portion, a fish hook, means for connecting the first hook to the lure body adjacent the flexible tail, said means including a rod on which the hook is mounted, and screws for connecting the ends of the rod to the lure body, one of said screws being inclined downwardly and rearwardly and connected to the rear end of the rod and having a portion in the path of movement of the hook to limit its movement toward the tail.

4. A fish lure including a body portion, a fish hook, and means for connecting the hook to the body, said means including a rod on which the hook is mounted, a screw for securing the forward end of the rod, and an eye-bolt connected to the body with one end of the rod passing through the eye of the bolt, said eye portion of the bolt being inclined downwardly and rearwardly and adapted to limit movement of the hook in one direction.

SAM F. DAVENPORT.